United States Patent
Srivastava et al.

(10) Patent No.: US 11,113,652 B2
(45) Date of Patent: Sep. 7, 2021

(54) SYSTEM AND METHOD FOR A RECOMMENDATION MECHANISM REGARDING STORE REMODELS

(71) Applicant: Walmart Apollo, LLC, Bentonville, AR (US)

(72) Inventors: Nikesh Srivastava, Bangalore (IN); Sameer Shah, Bangalore (IN); Uruj Fatima, New Delhi (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/569,892

(22) Filed: Sep. 13, 2019

(65) Prior Publication Data
US 2020/0090101 A1 Mar. 19, 2020

Related U.S. Application Data

(60) Provisional application No. 62/779,071, filed on Dec. 13, 2018.

(30) Foreign Application Priority Data

Sep. 14, 2018 (IN) .............................. 201811034767

(51) Int. Cl.
*G06Q 10/00* (2012.01)
*G06Q 10/06* (2012.01)
*G06Q 10/04* (2012.01)
*G06K 9/62* (2006.01)

(52) U.S. Cl.
CPC ..... *G06Q 10/06375* (2013.01); *G06K 9/6278* (2013.01); *G06Q 10/04* (2013.01)

(58) Field of Classification Search
CPC .............. G06Q 10/06; G06Q 10/0631; G06Q 10/06313; G06Q 10/063118; G06Q 10/08; G06Q 10/04; G06Q 10/06375; G06Q 10/063; G06Q 10/06315; G06Q 30/0283; G06Q 30/02; G06Q 30/0201; G06Q 30/00; G06Q 30/0202; G06Q 50/16; G06Q 50/08; G06Q 50/163; G06Q 40/06; G06K 9/6278
See application file for complete search history.

(56) References Cited

U.S. PATENT DOCUMENTS

| | | |
|---|---|---|
| 8,055,547 B2 | 11/2011 | Kelly et al. |
| 2003/0028393 A1* | 2/2003 | Coulston ................ G06Q 10/06 705/400 |
| 2003/0028417 A1 | 2/2003 | Fox |
| 2003/0069782 A1 | 4/2003 | Chrisman et al. |

(Continued)

OTHER PUBLICATIONS

Liu, S., & Wang, C. (2011). Optimizing project selection and scheduling problems with time-dependent resource constraints. Automation in Construction, 20(8), 1110-1119. (Year: 2011).*

(Continued)

*Primary Examiner* — William S Brockington, III
(74) *Attorney, Agent, or Firm* — Duane Morris LLP; Manita Rawat

(57) ABSTRACT

An iterative, tiered system for identifying which assets need to be remodeled. This tiered system uses a Bayesian Structural Time Series, followed by an ensemble classification and cost estimation. The results are then input into an optimization model, where the best possible set of stores is selected according to the constraints. Remodeling of the store then commences.

17 Claims, 4 Drawing Sheets

(56) References Cited

U.S. PATENT DOCUMENTS

| | | |
|---|---|---|
| 2005/0091012 A1 | 4/2005 | Przytula et al. |
| 2009/0076888 A1 | 3/2009 | Oster et al. |
| 2013/0173325 A1* | 7/2013 | Coleman .......... G06Q 10/06315 705/7.22 |
| 2013/0262174 A1 | 10/2013 | Singh et al. |
| 2013/0332223 A1 | 12/2013 | Cavander et al. |
| 2016/0132804 A1* | 5/2016 | Croft ................ G06Q 10/06313 705/7.23 |
| 2019/0025810 A1* | 1/2019 | Chapin ................. G06Q 10/20 |

OTHER PUBLICATIONS

"Maximizing Return on Store Space with Optimization", Revionics, pp. 1-16, Jul. 2013.

"Renovating your store—expense or investment?", Rob Wilbrink, pp. 40, May/Jun. 2009.

"Commercial guide: your retail renovation budget", Serena Solomon, pp. 1-8, Sep. 19, 2017.

International Search Report and Written Opinion dated Nov. 15, 2019 in corresponding International Application No. PCT/US2019/051045, 14 pages.

Gjin, B. et al., "Big Boxes versus Traditional Shopping Centers: Looking At Households Shopping Trip Patterns", Journal of Real Estate Literature, vol. 14, No. 2, 2006, pp. 173-202.

Silva-Risso, J. et al., "Practice Prize Winner—A Nested Logit Model of Product and Transaction-Type Choice for Planning Automakers Pricing and Promotions", Institute for Operations Research and Management Sciences (INFORMS), vol. 27, No. 4, pp. 545-566.

\* cited by examiner

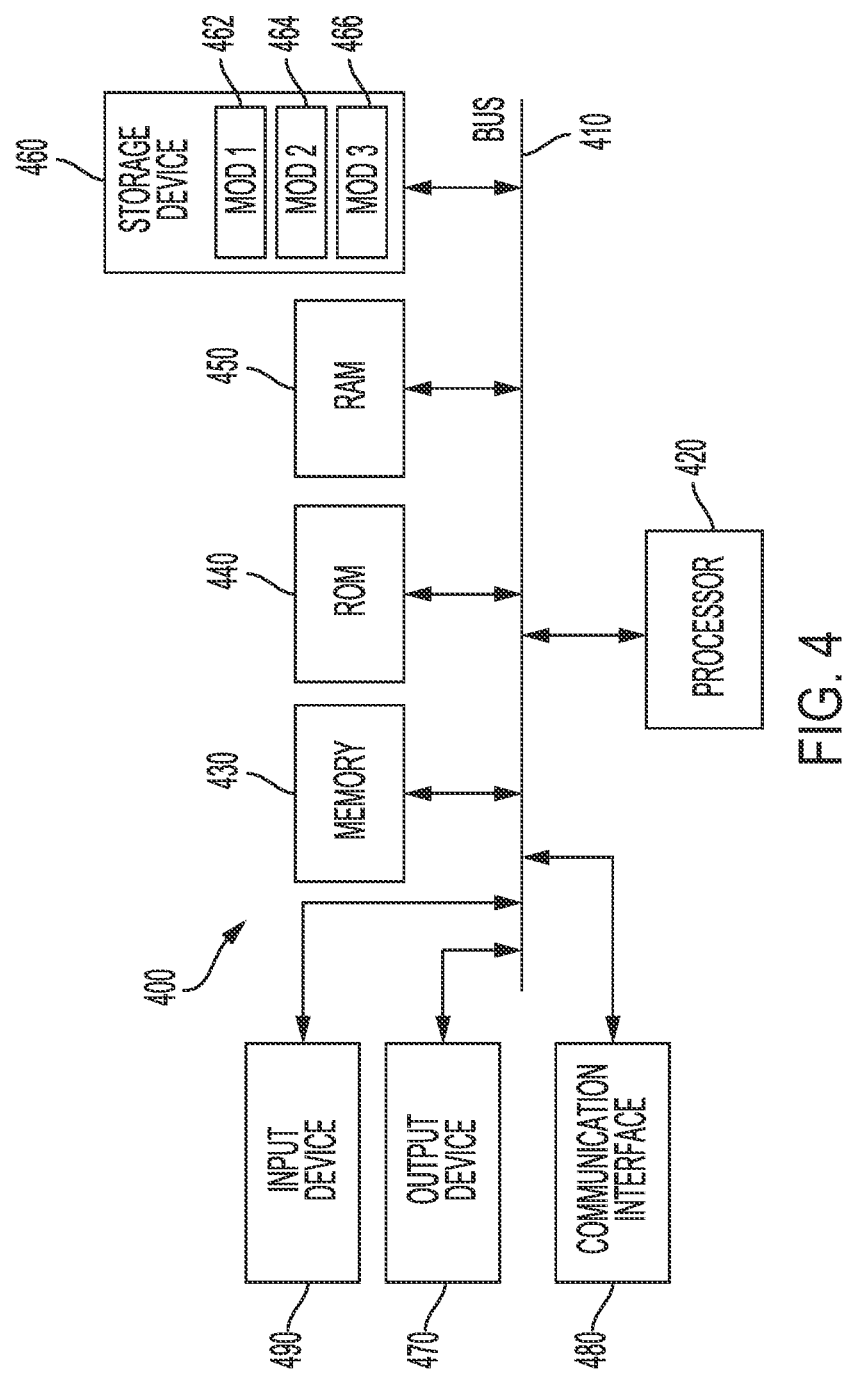

SYSTEM AND METHOD FOR A RECOMMENDATION MECHANISM REGARDING STORE REMODELS

PRIORITY

The present application claims priority to U.S. provisional patent application No. 62/779,071, filed Dec. 13, 2018, and Indian provisional patent application number 201811034767, filed Sep. 14, 2018, the contents of which are incorporated herein in their entirety.

BACKGROUND

1. Technical Field

The present disclosure relates to determining when to remodel a store, and more specifically to a multi-tiered iterative process for identifying which stores should be remodeled.

2. Introduction

Remodeling equipment or buildings already in use often represents a double impact to a company's bottom line. Not only does the company spend money in making the upgrades, the company often loses the ability to continue to use the asset while the remodel is occurring. To decide which stores need remodeling has been based on combination of data acquisition and comparison, and ultimately a hunch or guess as to which assets should be remodeled. That is, rather than relying upon hunches and data, there needs to be a quantifiable, repeatable, and technical solution to identifying which assets are remodeled and which are not.

Technical Problem

How to improve accuracy and consistency of a computer system making remodeling recommendations. More specifically, how to consider ~2^500 possible variations to how the store is remodeled, using a processor, faster and more accurately.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method configured as disclosed herein can include: analyzing a profitability impact of a remodel on a store using a Bayesian Structural Time Series model; generating, using the profitability impact, a lift classification of the store; generating a remodel score for the store based on the lift classification and a cost estimate of the remodel; determining that the remodel score is above a threshold, to yield a determination; and remodeling the store based on the determination.

An exemplary system configured as disclosed herein can include: a processor; and a computer-readable storage medium having instructions stored which, when executed by the processor, cause the processor to perform operations comprising: analyzing a profitability impact of a remodel on a store using a Bayesian Structural Time Series model; generating, using the profitability impact, a lift classification of the store; generating a remodel score for the store based on the lift classification and a cost estimate of the remodel; determining that the remodel score is above a threshold, to yield a determination; and initiating remodeling the store based on the determination.

An exemplary non-transitory computer-readable storage medium as configured herein can contain instructions which, when executed by a computing device, cause the computing device to perform operations which include: analyzing a profitability impact of a remodel on a store using a Bayesian Structural Time Series model; generating, using the profitability impact, a lift classification of the store; generating a remodel score for the store based on the lift classification and a cost estimate of the remodel; determining that the remodel score is above a threshold, to yield a determination; and initiating remodeling the store based on the determination.

BRIEF DESCRIPTION OF THE DRAWINGS

FIG. 4 illustrates a computer system.

DETAILED DESCRIPTION

Figure 1:
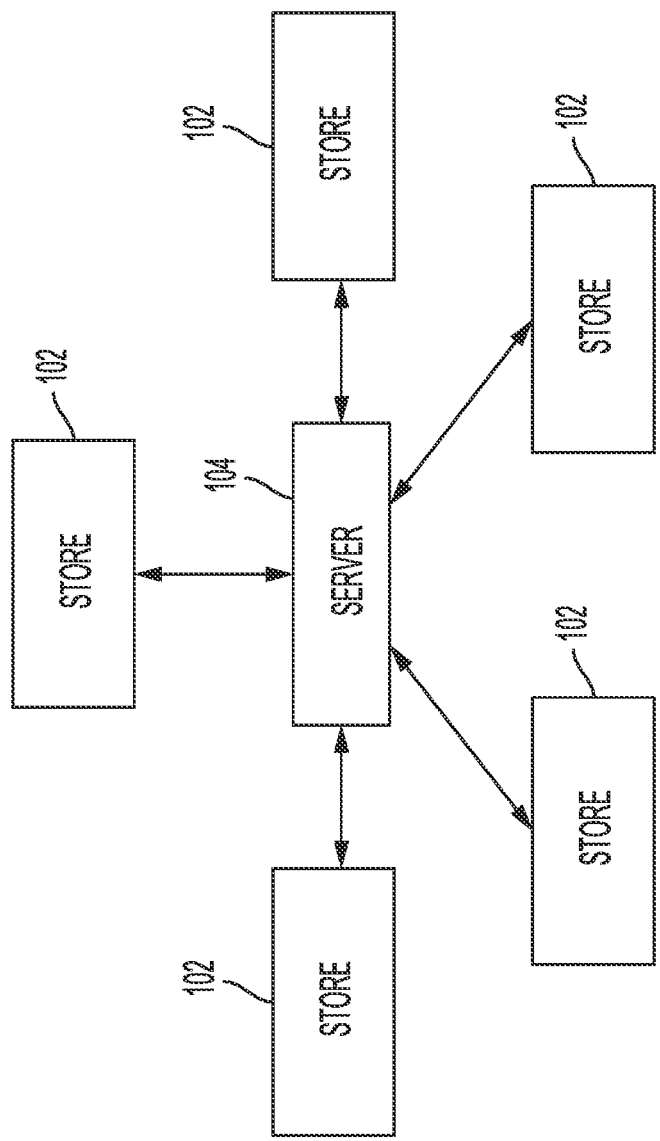
FIG. 1 illustrates an example of stores communicating with a central server.

Various embodiments of the disclosure are described in detail below. While specific implementations are described, it should be understood that this is done for illustration purposes only. Other components and configurations may be used without parting from the spirit and scope of the disclosure.

The steps outlined herein are exemplary and can be implemented in any combination thereof, including combinations that exclude, add, or modify certain steps. However, among the technical improvements disclosed herein to the recommendation process, the specific order of algorithms disclosed herein increases the accuracy of remodeling decisions while reducing the number of processing steps required to make a remodeling decision. That is, processors executing methods as described herein are able to make specific computations faster because of the order in which the various operations occur.

While examples are provided for remodeling stores, the concepts disclosed herein can be applied to any circumstance where assets need to be remodeled, refurbished, or otherwise maintained.

Described herein are various solutions to the technical problem of how to improve accuracy and consistency of a computer system making remodeling recommendations. Whereas previous solutions to the question of "When should we remodel a store?" were based on rules (e.g., select the oldest store, the biggest store, the store with the highest revenue, etc.), the technical solutions described herein determine the likely improvement in store profit ("sales lift") if the store is remodeled, then rank the stores based on that sales lift such that the "best" stores to improve are selected for remodeling. The modeling process to determine sales lift uses a Bayesian Structural Time Series (BSTS) model which runs thousands of simulations while simultaneously determining the parameters of the time series. To determine the best way to remodel the store, the models disclosed herein consider approximately ~2^500 possible variations to how the store is remodeled. Another technical problem solved by this disclosure is how to consider all of these possibilities, using a processor, faster.

The analysis starts by collecting data from various stores. For example, a server, database, or other collection point can collect data associated with weekly sales data for all the stores being analyzed. This collected data can include information about which stores were remodeled, when they were remodeled, what aspects of the store were remodeled, revenue/profit/rates of transactions before and after the remodel, etc. A Bayesian Structural Time Series (BSTS) model can be used to forecast the sales in a post-remodel store using this data. A BSTS model is a time series model using Bayesian context, meaning that the probabilities for hypotheses are updated over time as more evidence or information becomes available. A BSTS model can estimate the parameters of a time series accurately by considering the causal variables which factor into the values and determinations made by the model. Specifically, the BSTS can use machine learning to iteratively forecast sales, infer causal impact, and predict the sales in a store after a remodel occurs based on the data of (1) the store in question, and (2) the data associated with other stores (specifically, how the other stores sales increased or decreased based on specific aspects of the remodel).

The BSTS model can use a Kalman filter, doing a time series decomposition on the data associated with the various stores, along with trends (such as seasonality), regression analyses based on specific aspects of the data, etc. Based on that information, the most important regression predictions can be selected, averaged and used to predict future sales within a remodeled store based on features/aspects of the store being remodeled. For example, if the fruit section of a store is being remodeled (or under consideration for remodel), the BSTS can model, based on the previous sales of that particular store and other similar stores, how a remodel on the fruit section would affect future sales by executing a Kalman filter on the data, performing a time decomposition of the data, identifying trends, selecting the most important predictors of those trends (i.e., the trends which have a largest degree of influence on sales (i.e., above a predetermined value) using regression analysis), and modeling future sales with those important predictors.

In some configurations, the "most important" regression predictions can be selected using automated Bayesian variable selection methods, such as the "spike and slab" method. As an example, the spike and slab method allows the system to mix prior distributions in obtaining the most important predictors. In this manner, over time and with each iteration, the system executing the BSTS model can draw conclusions about causal connections (i.e., make a causal inference) by analyzing the responses (store sales) to variables (such as how much was spent on the remodel, what was remodeled, store location, etc.).

Additional factors that can be used include relationships between the stores. For example, the stores compete, to one degree or another, for shoppers, and therefore may see changes in the sales when a neighboring store is undergoing a remodel, a sale, or otherwise interfering/modifying the sales of the store under analysis. For example, it may be observed that the sales of a store suddenly increase or decrease by a significant amount. It can then be identified that these changes are due to events occurring at a neighboring score. Based on this information, the predictions of the BSTS can be modified, thereby accounting for unique circumstances, abnormal sales data, or other extremes.

Next, the system can score the predicted remodels using (1) an ensemble classification and/or (2) a non-parametric regression. These scoring mechanisms occur in parallel for each store, thereby reducing the time required to build and compare the models. Regarding the ensemble classification, this is a combination of multiple classification models. At this point, the system can use these multiple learning algorithms to obtain better predictions than any single algorithm alone. Exemplary classification models can include Random Forrest, SVM (Support Vector Machine) using a linear kernel, SVM using a polynomial kernel, XGBoost, and Ordinal Linear Regression. Each of the models used in the ensemble classification can be trained using the actual sales classifications for the stores remodeled in recent years. In addition, the models can use as inputs variables such as average income for the shoppers in the store location, average age of shoppers in the store location, food sales, store profit, store age, years since remodel, book value of store equipment, etc.

The models are iteratively trained using reference stores, and the multiple learning algorithms can each classify the store being analyzed based the data of the previously remodeled stores, the current store, and current circumstances of the remodel. The iterative training process can occur daily, weekly, monthly, yearly, or any other suitable time period. This training process is a rolling window, where the models are modified by replacing elements/data within the models (that is, replacing the code used to evaluate the stores) themselves. The classification to which the store is assigned (such as profitable, non-profitable, remodel required, etc.) can be changed over time, based on newly obtained data, changing standards, etc.

The non-parametric regression provides an expenditure estimation. The non-parametric regression is distinct from standard regressions due to a lack of fixed parameters, such that it can capture non-linearity. This algorithm uses similar reference stores, and is performed in four parts representing major expenditure categories. These categories include HVAC (Heating, Ventilation, and Air Conditioning), Refrigeration, Fixtures, and Flooring. Four separate models (one for each of the expenditure categories) are built using corresponding reference store expenditures, with variables specific to each respective category. The built, category-specific models can predict the costs associated with the particular categories based on the past data used in the BSTS from the store in question and other stores. The output of each of these models can include the candidate store identification and individual area expenditures, which can then be combined to generate a total predicted cost of the expenses in performing a remodel.

The system then provides a recommendation on which store(s) should be remodeled. Based on the expenditure estimation generated using non-parametric regression and the ensemble classification, the system has a total projected cost for each respective store and at least one classification of the store. When there are multiple stores, the system needs to determine which of these stores should be recommended for a remodel. This data can be used as constraint parameters and input for an objective function. The constraint parameters can be the number of stores to be recommended and the budget allocation. These parameters can, for example, be provided by a user. The objective function can be constructed to align with a particular business strategy, where the remodel store selection is a tradeoff between the "need to remodel" and "profit from remodel."

For example, the measure of profit equation can read:

Measure of Profit=Sales×SPC×(Min.Score−Lift classification)

The measure of a need for remodel equation can read:

Measure of Need for Remodel=Total Estimate of Expenditures×YSLT, where
Sales=Rolling total sales of the candidate score
SPC=Store Profit Contribution of the candidate store
Lift classification=Estimated sales lift class of the candidate store
Total Estimate of Expenditures=Total Estimated Expenditures for the candidate store
YSLT=Years Since Last Touch, i.e., the years since the last modification that took place for the candidate store These values can be scaled, or normalized, by finding the minimum and maximum of the candidate stores, then modifying the values such that the maximum is set to 100, the minimum is set to 1, and the remaining values are adjusted accordingly. The lift classification can be, for example, between 1 and 5, with 1 representing stores which have the highest positive lift (increase in profits) while 5 is a negative lift (decrease in profits), due to the potential remodel.

The Objective Function can be: (C1×Measure of Profit)+(C2×Measure of Need for Remodel), where the coefficients (C1 and C2) can be tuned a computing system (per requirements of the user or per determinations made through a regression analysis regarding the best combination of C1 and C2 for a maximized sales lift) by specifying the values from an interface. That is, the system can select how much the profit or need for remodel respectively play into the remodel score. Alternatively, over time the system can identify the ratio of C1/C2, to identify the respective weighting of each measure which provides the most return for remodels.

Based on the objective function scores, the system can then rank the various stores being analyzed and select the top scores, based on predetermined cutoff scores, remodel allocation amounts, etc. For example, it may be that only a single store is going to be remodeled, in which case only the top ranked store (based on the objective function scores) is selected. In other cases, multiple stores can be selected (for example, a fixed number, or where a predetermined amount of scores above a threshold are selected, etc.)

FIG. 1 illustrates an example of stores communicating with a central server. In this example, several stores 102 are communicating data with a central server 104. The stores 102 can communicate data to the server 104 regarding total sales, as well as particular data regarding what items are sold, in what areas, at what times, promotions going on at the stores, etc. This data can be saved in the server 104 or additional databases for use in the tiered analyses.

Figure 2:
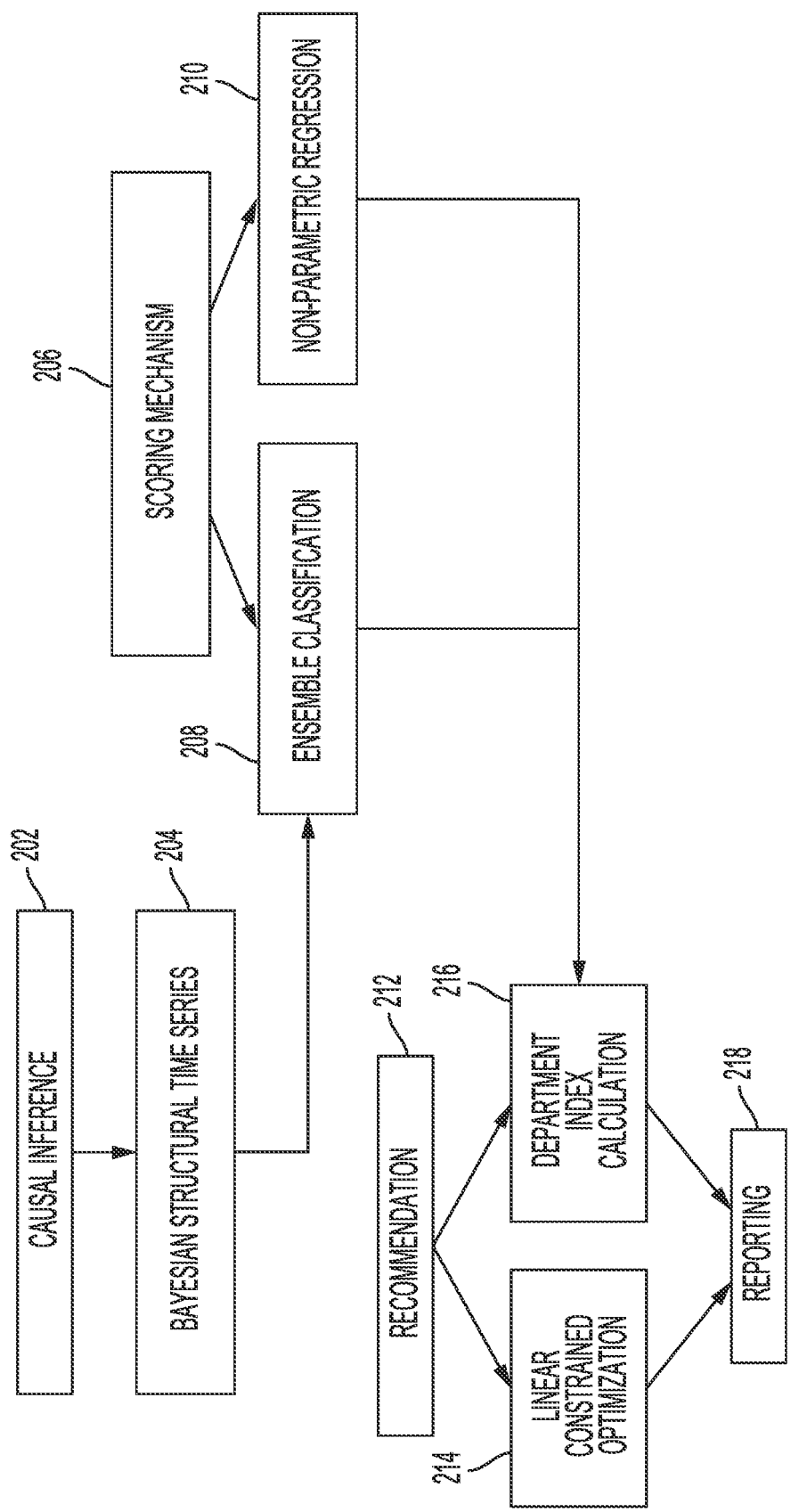
FIG. 2 illustrates a tiered series of specific algorithms to identify stores for remodeling.

FIG. 2 illustrates a tiered series of specific algorithms to identify stores for remodeling. In this example, a causal inference 202 is determined using a Bayesian Structural Time Series (BSTS) 204.

Next, the system scores the store or stores which are being considered for a remodel, through a two part scoring mechanism 206. This two part scoring mechanism 206 includes an ensemble classification 208 and a non-parametric regression 210, each of which can be done in parallel or serially with respect to one another. The output of the BSTS 204 modeling can be used as input to the various algorithms used in the ensemble classification.

Next, the system generates a recommendation 212 on which stores should be remodeled, using linear constrained optimization 214 and a department index calculation 216. Again, the linear constrained optimization 214 and the department index calculation 216 can be performed in parallel or serially with respect to one another. The linear constrained optimization 214 can use constraints, such as budgets or the number of stores to be remodeled, in determining which stores should be remodeled based on the outputs of the non-parametric regression 210 and the ensemble classification 208. The department index calculation 216 can take into account the specific needs for categories of improvements (i.e., HVAC, flooring, refrigeration, fixtures), to calculate total costs for a remodel. Using this data, the system generates a report 218 containing recommendations for the remodel.

Figure 3:
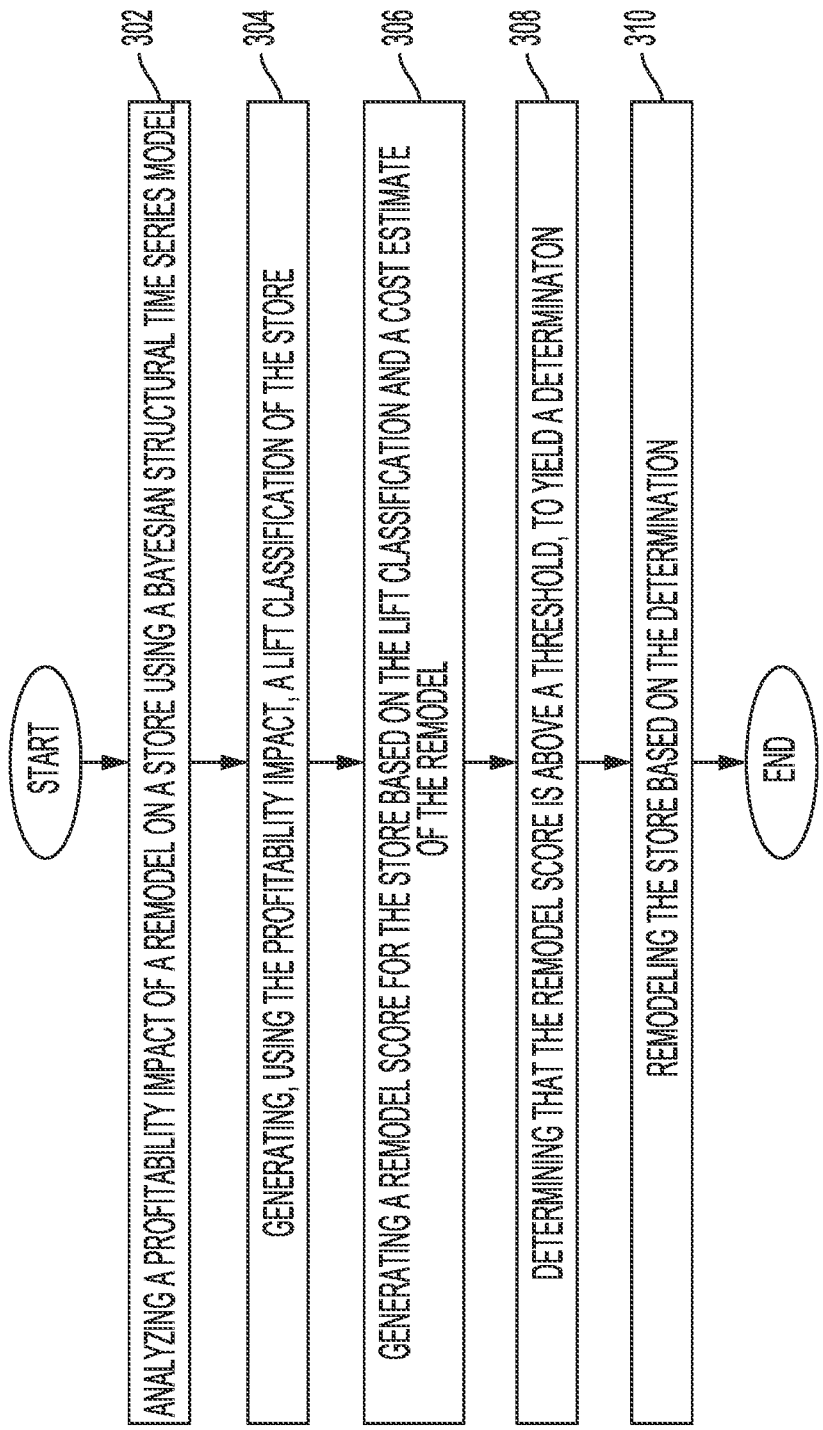
FIG. 3 illustrates an example method embodiment.

FIG. 3 illustrates an example method embodiment. In this example, analysis occurs of a profitability impact of a remodel on a store using a Bayesian Structural Time Series model (302). The system/practitioner generates, using the profitability impact, a lift classification of the store (304), and generates a remodel score for the store based on the lift classification and a cost estimate of the remodel (306). The system/practitioner determines that the remodel score is above a threshold, to yield a determination (308), and remodels the store based on the determination (310)

In some configurations, the Bayesian Structural Time Series model uses a Kalman filter to iteratively predict future sales data of the store based on historical sales data of the store, and the cost estimate is generated using a non-parametric regression model, the non-parametric regression model assigning weights to expenditures for the store based on historical data of previously remodeled stores. Furthermore, the determining that the remodel score is above the threshold can be based on a linear optimization model, where the linear optimization model uses, as input, a total budget.

In some configurations, the method illustrated and described can further include applying the analyzing, the identifying, and the generating to a plurality of stores, to yield a plurality of remodel scores; ranking the plurality of remodel scores, to yield ranked remodel scores; and identifying, as part of the determining that the remodel score is above the threshold, that the store is ranked highest among the ranked remodel scores.

In some configurations, the method illustrated and described can further include performing an expenditure estimation to generate the cost estimate, wherein the expenditure estimation is performed in parallel with the generating of the list classification.

In some configurations, the cost estimate identifies costs for: HVAC (Heating, Ventilation, and Air Conditioning), Refrigeration, Fixtures, and Flooring.

In some configurations, the generating of the remodel score can include a weighted combination of a measure of profit for the store and a measure of a need of remodeling the store.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A computer-implemented method, comprising:
generating, via a processor, a trained Bayesian Structural Time Series machine learning model, wherein the trained Bayesian Structural Time Series machine learning model is iteratively trained by a first training data set comprising sales data for one or more stores;
analyzing, via the processor, a profitability impact of a remodel on a target store using the trained Bayesian Structural Time Series machine learning model;
generating, via the processor, a trained non-parametric regression machine learning model, wherein the trained non-parametric regression machine learning model is iteratively trained by a second training data set;
performing, in parallel via the processor:
generating a lift classification of the target store using the profitability impact; and
generating a cost estimate for the remodel using the trained non-parametric regression machine learning model;
generating, via the processor, a remodel score for the target store based on the lift classification and the cost estimate of the remodel; and
determining, via the processor, that the remodel score is above a threshold, to yield a determination.

2. The method of claim 1, wherein:
the first training data set comprises historical sales data of the target store;
wherein the trained Bayesian Structural Time Series machine learning model implements a Kalman filter to iteratively predict future sales data of the target store based on the historical sales data of the target store; and
wherein generating the trained non-parametric regression machine learning model includes assigning weights to expenditures for the target store based on historical data of previously remodeled stores.

3. The method of claim 2, wherein the determining that the remodel score is above the threshold is based on a linear optimization model, where the linear optimization model uses, as input, a total budget.

4. The method of claim 1, further comprising:
applying the analyzing, determining, and the generating the lift classification and the remodel score steps to a plurality of stores to yield a plurality of remodel scores;

ranking the plurality of remodel scores, to yield ranked remodel scores; and identifying, as part of the determining that the remodel score is above the threshold, that the target store is ranked highest among the ranked remodel scores.

5. The method of claim 1, wherein the cost estimate identifies costs for: HVAC (Heating, Ventilation, and Air Conditioning), Refrigeration, Fixtures, and Flooring.

6. The method of claim 1, wherein the generating of the remodel score comprises a weighted combination of a measure of profit for the target store and a measure of a need of remodeling the target store.

7. A system comprising:
a processor; and
a computer-readable storage medium having instructions stored which, when executed by the processor, cause the processor to perform operations comprising:
generating a trained Bayesian Structural Time Series machine learning model, wherein the trained Bayesian Structural Time Series machine learning model is iteratively trained by a first training data set comprising sales data for one or more stores;
analyzing a profitability impact of a remodel on a target store using the trained Bayesian Structural Time Series machine learning model;
generating a trained non-parametric regression machine learning model, wherein the trained non-parametric regression machine learning model is iteratively trained by a second training data set;
performing, in parallel via the processor:
determining a cost estimate for the remodel using the trained non-parametric regression machine learning model; and
generating, using the profitability impact, a lift classification of the target store;
generating a remodel score for the target store based on the lift classification and the cost estimate of the remodel; and
determining that the remodel score is above a threshold, to yield a determination.

8. The system of claim 7, wherein
the first training data set comprises historical sales data of the target store;
wherein the trained Bayesian Structural Time Series machine learning model implements a Kalman filter to iteratively predict future sales data of the target store based on the historical sales data of the target store; and
wherein generating the trained non-parametric regression machine learning model includes assigning weights to expenditures for the store based on historical data of previously remodeled stores.

9. The system of claim 8, wherein the determining that the remodel score is above the threshold is based on a linear optimization model, where the linear optimization model uses, as input, a total budget.

10. The system of claim 7, the computer-readable storage medium having additional instructions stored which, when executed by the processor, cause the processor to perform operations comprising:
applying the analyzing, the determining, and the generating the lift classification and the remodel score steps to a plurality of stores, to yield a plurality of remodel scores;
ranking the plurality of remodel scores, to yield ranked remodel scores; and
identifying, as part of the determining that the remodel score is above the threshold, that the target store is ranked highest among the ranked remodel scores.

11. The system of claim 7, wherein the cost estimate identifies costs for: HVAC (Heating, Ventilation, and Air Conditioning), Refrigeration, Fixtures, and Flooring.

12. The system of claim 7, wherein the generating of the remodel score comprises a weighted combination of a measure of profit for the target store and a measure of a need of remodeling the target store.

13. A non-transitory computer-readable storage medium having instructions stored which, when executed by a computing device, cause the computing device to perform operations comprising:
generating a trained Bayesian Structural Time Series machine learning model, wherein the trained Bayesian Structural Time Series machine learning model is iteratively trained by a first training data set comprising sales data for one or more stores;
analyzing a profitability impact of a remodel on a target store using the trained Bayesian Structural Time Series machine learning model;
generating a trained non-parametric regression machine learning model, wherein the trained non-parametric regression machine learning model is iteratively trained by a second training data set;
performing, in parallel via the computing device:
determining a cost estimate for the remodel using the trained non-parametric regression machine learning model; and
generating, using the profitability impact, a lift classification of the target store;
generating a remodel score for the target store based on the lift classification and the cost estimate of the remodel; and
determining that the remodel score is above a threshold, to yield a determination.

14. The non-transitory computer-readable storage medium of claim 13, wherein
the first training data set comprises historical sales data of the target store;
wherein the trained Bayesian Structural Time Series machine learning model implements a Kalman filter to iteratively predict future sales data of the store based on the historical sales data of the store; and
wherein generating the trained non-parametric regression machine learning model includes assigning weights to expenditures for the store based on historical data of previously remodeled stores.

15. The non-transitory computer-readable storage medium of claim 14, wherein the determining that the remodel score is above the threshold is based on a linear optimization model, where the linear optimization model uses, as input, a total budget.

16. The non-transitory computer-readable storage medium of claim 13, having additional instructions stored which, when executed by the computing device, cause the computing device to perform operations comprising:
applying the analyzing, the determining, and the generating the lift classification and the remodel score steps to a plurality of stores, to yield a plurality of remodel scores;
ranking the plurality of remodel scores, to yield ranked remodel scores; and
identifying, as part of the determining that the remodel score is above the threshold, that the target store is ranked highest among the ranked remodel scores.

17. The non-transitory computer-readable storage medium of claim 13, wherein the cost estimate identifies costs for: HVAC (Heating, Ventilation, and Air Conditioning), Refrigeration, Fixtures, and Flooring.

* * * * *